(12) United States Patent
Woodage et al.

(10) Patent No.: US 9,075,501 B1
(45) Date of Patent: Jul. 7, 2015

(54) VISUAL PLANNER FOR STRATEGIC PLANNING

(71) Applicants: Katherine V. Woodage, Austin, TX (US); Allison B. Corbett, Framingham, MA (US); Michael D. Sandberg, Orem, UT (US)

(72) Inventors: Katherine V. Woodage, Austin, TX (US); Allison B. Corbett, Framingham, MA (US); Michael D. Sandberg, Orem, UT (US)

(73) Assignee: CA, Inc., New York, NY (US)

( * ) Notice: Subject to any disclaimer, the term of this patent is extended or adjusted under 35 U.S.C. 154(b) by 302 days.

(21) Appl. No.: 13/842,425

(22) Filed: Mar. 15, 2013

(51) Int. Cl.
*G06F 3/0481* (2013.01)

(52) U.S. Cl.
CPC .................................. *G06F 3/0481* (2013.01)

(58) Field of Classification Search
CPC ....................................................... G06F 3/0481
USPC .......................................................... 715/764
See application file for complete search history.

(56) References Cited

U.S. PATENT DOCUMENTS

| | | | |
|---|---|---|---|
| 6,430,542 B1 * | 8/2002 | Moran | 705/36 R |
| 7,130,822 B1 * | 10/2006 | Their et al. | 705/35 |
| 8,036,907 B2 * | 10/2011 | Davies et al. | 705/1.1 |
| 8,095,436 B1 * | 1/2012 | Shah et al. | 705/30 |
| 8,626,617 B1 * | 1/2014 | Bhatt | 705/30 |
| 2004/0230508 A1 * | 11/2004 | Minnis, Jr. et al. | 705/35 |
| 2005/0044028 A1 * | 2/2005 | Torres | 705/36 |
| 2006/0010023 A1 * | 1/2006 | Tromczynski et al. | 705/8 |
| 2006/0173706 A1 * | 8/2006 | Allin et al. | 705/1 |
| 2007/0055597 A1 * | 3/2007 | Patel et al. | 705/35 |
| 2008/0168376 A1 * | 7/2008 | Tien et al. | 715/772 |
| 2008/0172405 A1 * | 7/2008 | Feng et al. | 707/102 |
| 2009/0037883 A1 * | 2/2009 | Garbers et al. | 717/125 |
| 2009/0055207 A1 * | 2/2009 | Suarez et al. | 705/1 |
| 2009/0112887 A1 * | 4/2009 | Weber et al. | 707/100 |
| 2009/0300047 A1 * | 12/2009 | Carlson et al. | 707/102 |
| 2010/0306126 A1 * | 12/2010 | Moran et al. | 705/36 R |
| 2011/0066998 A1 * | 3/2011 | Scandura | 717/100 |
| 2011/0093401 A1 * | 4/2011 | Waite | 705/303 |
| 2013/0055155 A1 * | 2/2013 | Wong et al. | 715/810 |
| 2014/0122310 A1 * | 5/2014 | TORRENS et al. | 705/35 |
| 2014/0249869 A1 * | 9/2014 | Daughtrey, Rodney S. | 705/5 |

* cited by examiner

*Primary Examiner* — Reza Nabi
(74) *Attorney, Agent, or Firm* — Baker Botts L.L.P.

(57) ABSTRACT

In certain embodiments, a method includes accessing planning information, the planning information comprising information associated with an overall plan and sub-plans of the overall plan. The method further includes generating a visual planner comprising nodes arranged in an organogram structure. The nodes comprise a parent node and child nodes. The parent node comprises an identification of a first portion of the overall plan, a goal amount corresponding to the first portion of the plan, and a plan amount. Each child node comprises an identification of a corresponding portion of the overall plan, a corresponding plan amount for the corresponding portion of the plan, and a corresponding goal amount for the corresponding portion of the plan. The plan amount of the parent node comprises the sum of the plan amounts of the child nodes.

21 Claims, 5 Drawing Sheets

VISUAL PLANNER FOR STRATEGIC PLANNING

BACKGROUND

The present disclosure generally relates to computer systems, and more particularly, to a visual planner for strategic planning. An organization may use strategic plans to plan, allocate, and track, the organization's resources and goals. Each department in an organization may present its strategic plan in its own individual spreadsheet or other format. Each department's strategic plan may then be compiled together to form an organization's overall strategic plan.

BRIEF SUMMARY

In certain embodiments, a method includes accessing planning information, the planning information comprising information associated with an overall plan and sub-plans of the overall plan. The method further includes generating a visual planner comprising nodes arranged in an organogram structure. The nodes comprise a parent node and child nodes. The parent node comprises an identification of a first portion of the overall plan, a goal amount corresponding to the first portion of the plan, and a plan amount. Each child node comprises an identification of a corresponding portion of the overall plan, a corresponding plan amount for the corresponding portion of the plan, and a corresponding goal amount for the corresponding portion of the plan. The plan amount of the parent node comprises the sum of the plan amounts of the child nodes.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION

Figure 1:
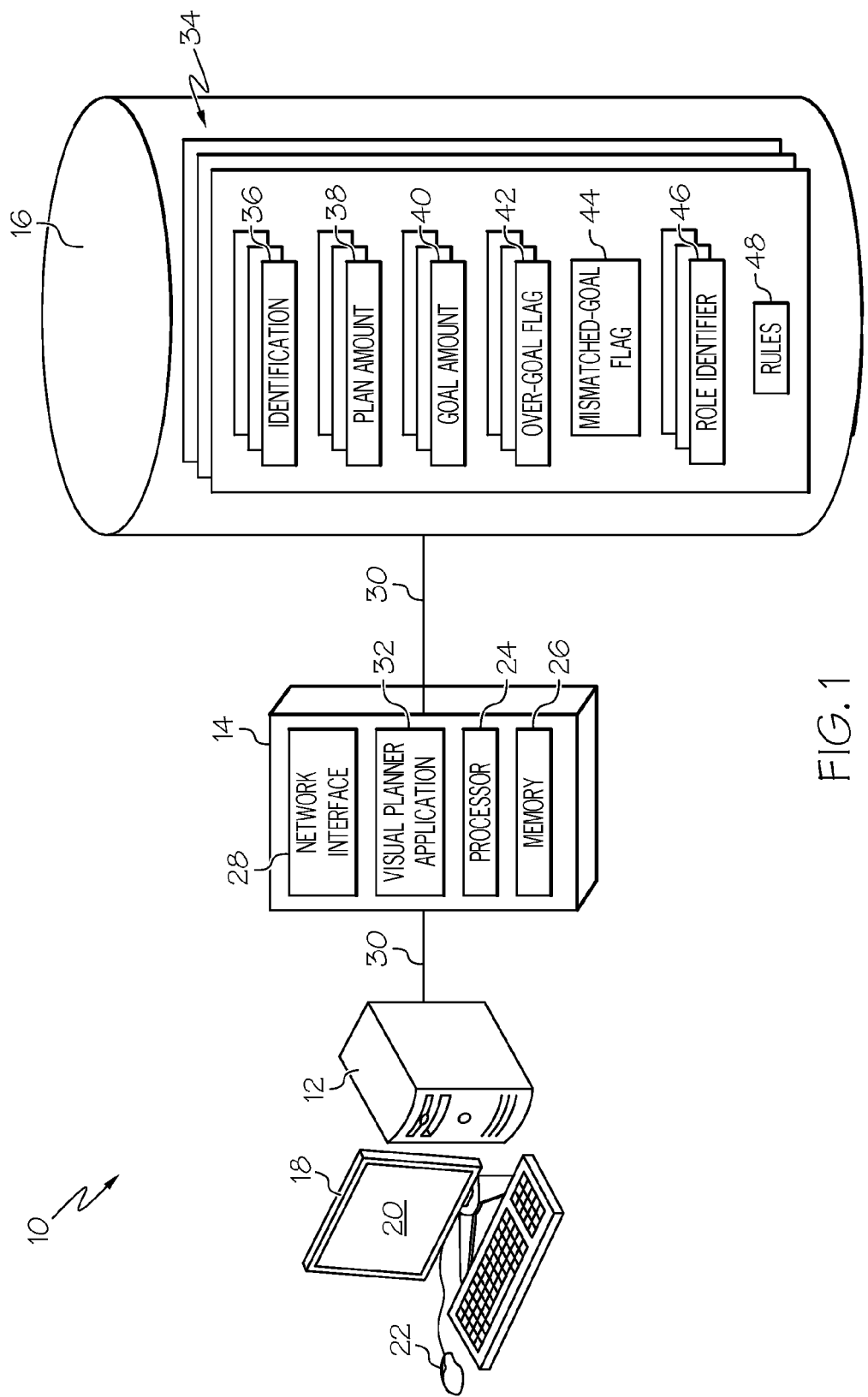
FIG. 1 illustrates an example system for generating a visual planner for strategic planning, according to certain embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Leadership of and other appropriate personnel associated with an organization may desire to view and otherwise manage strategic plans of the organization. For example, a manager may desire to view the proposed and targeted headcount of each department across an organization. As another example, a manager may desire to manipulate the allocation of personnel to different aspects of the strategic plan, and to view the implications of selected allocations to the overall strategic plan. However, viewing and manipulating the strategic plan across each department may be complicated. For instance, the strategic plan may be strewn across multiple documents. This makes it difficult for a manager to view the strategic plan from a high-level and, further, to drill down the strategic plan into its individual components. In addition, it may be difficult for a manager to determine if the overall strategic plan matches the targeted totals for each department's plan.

Therefore, it may be advantageous to provide visual planner for strategic planning. The system generates a visual planner comprising a plurality of nodes arranged in an organogram structure. An organogram structure may include a structure akin to an organizational chart wherein an item is shown as a node with hierarchal significance and the relationships of each item to each other is shown. The nodes may include one or more parent nodes and one or more child nodes. The parent node comprises an identifier, a plan amount, and a goal amount. The child node comprises an identifier, a plan amount, and a goal amount. This may improve a user's efficiency to view strategic plans for an organization and find mismatched or over-allotted plans and goals. In addition, by using a more natural organogram structure, embodiments of the present disclosure may improve the usability and readability of a strategic plan. In addition, this may improve a user's ability to view and manage a convoluted strategic plan in one module. In addition, embodiments of the present disclosure substantially instantaneously update plans and goals and automatically discover problems within the plan. In addition, embodiments of the present disclosure may provide the user flexibility in arranging the visual display to show only essential items or visual representation of the nodes.

FIG. 1 illustrates example system 10 for generating a visual planner for strategic planning, according to certain embodiments of the present disclosure. In the illustrated example, system 10 includes computer system 12, processing system 14, and storage module 16. Although system 10 is illustrated and primarily described as including particular numbers and types of components arranged in a particular manner, the present disclosure contemplates system 10 including any suitable numbers and types of components arranged in any suitable manner, according to particular needs. In general, according to certain embodiments of the present disclosure, computer system 12 communicates with processing system 14 to generate a visual planner for a strategic plan using information stored in storage module 16.

Computer system 12 may be implemented using any suitable type of processing system and may include any suitable combination of hardware, firmware, and software. Computer system 12 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device capable of receiving, processing, storing, and/or communicating information with other components of system 10. Computer system 12 may be a stand-alone computer or may be a part of a larger network of computers associated with an entity.

Computer system 12 may include display 18, which may include any suitable device operable to visually present information to a user. Display 18 may present a graphical user interface ("GUI") 20, which may comprise a visual interface operable to allow a user to interface with computer system 12. Generally, GUI 20 provides the user with an efficient and user-friendly presentation of data provided by system 10, such as charts, tables and other information. GUI 20 may comprise a plurality of displays having interactive fields, pull-down lists, and buttons operated by the user. In one example, GUI 20 presents multiple charts and tables according to specification by the user and receives commands from the user. It should be understood that the term graphical user interface may be used in the singular or in the plural to describe one or more graphical user interfaces and each of the displays of a particular graphical user interface. Further, GUI 20 contemplates any graphical user interface, such as a generic web browser, that processes information in system 10 and efficiently presents the information to the user. Computer system 12 can accept data from the user via the web browser (e.g., MICROSOFT INTERNET EXPLORER, GOOGLE CHROME, or MOZILLA FIREFOX) and return the appropriate HTML or eXtensible Markup Language (XML) responses.

Computer system 12 may include input device 22. Input device 22 allows a user to interact with processing system 14 through computer system 12. Input device 22 may comprise of any user interface, such as a display, keyboard, mouse, or other appropriate terminal equipment.

Computer system 12 may interact with processing system 14 to generate a visual planner in system 10. For example, computer system 12 communicates with processing system 14 to display a visual representation of the parent node and child nodes of the strategic plan. A user may view and otherwise interact with a displayed visual planner using computer system 12.

Processing system 14 may be implemented using any suitable type of processing system and may include any suitable combination of hardware, firmware, and software. Processing system 14 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, smart phones, table computers, one or more servers, a server pool, one or more processors within these or other devices, or any other suitable processing device capable of receiving, processing, storing, and/or communicating information with other components of system 10. Processing system 14 may be a stand-alone computer or may be a part of a larger network of computers associated with an entity. Processing system 14 may be a part of or distinct from computer system 12.

Processing system 14 may include processor 24 and memory 26. Processor 24 may include one or more microprocessors, controllers, or any other suitable computing devices or resources. Processor 24 may work, either alone or with other components of system 10, to provide a portion or all of the functionality of system 10 described herein. Memory 26 includes any suitable combination of volatile and non-volatile local or remote devices suitable for storing information. For example, memory 26 may include random access memory (RAM), read only memory (ROM), magnetic storage devices, optical storage devices, or any other suitable information storage device or a combination of these devices. Memory 26 may be a part of or distinct from processing system 14. Memory 26 may store, either permanently or temporarily, data, operational software, or other information for processing system 14.

Processing system 14 may include network interface 28. Network interface 28 represents any suitable device for receiving and/or sending information via one or more links 30. Network interface 28 represents any port or connection, real or virtual, including any suitable hardware and/or software, including protocol conversion and data processing capabilities, to communicate through a local area network (LAN), wide area network (WAN), or other communication system that allows processing system 14 to exchange information with computer system 12.

Links 30 facilitate wireless or wireline communication and may communicate, for example, IP packets, Frame Relay frames, ATM cells, voice, video, data, and other suitable information between network addresses. Links 30 may include one or more LANs, RANs, MANs, WANs, mobile networks (e.g., using WiMax (802.16), WiFi (802.11), 3G, or any other suitable wireless technologies in any suitable combination), all or a portion of the global computer network known as the Internet, and/or any other communication system or systems at one or more locations, any of which may be any suitable combination of wireless and wireline.

Processing system 14 includes visual planner application 32, which may be implemented using any suitable combination of hardware, firmware, and software. Although described primarily in the singular, visual planner application 32 may include any suitable number and types of visual planner applications 32. In certain embodiments, visual planner application 32 includes software code comprising a set of instructions that instructs computer system 12 or processing system 14 on how to generate a visual planner for strategic planning.

Visual planner application 32 may be operable to generate a visual planner. For example, visual planner application 32 may generate the visual planner in GUI 20 of computer system 12. The visual planner may include a representation of the strategic plan of an organization. In certain embodiments, a user is able to interact with the visual planner to see various portions of the strategic plan and to modify certain variables representing aspects of the strategic plan to view the impact, possibly in real time, of those modifications. Although the present disclosure describes primarily an embodiment in which the plan represented by the visual planner is a strategic plan of an organization, the present disclosure contemplates the generated visual planner representing any suitable type of plan for any suitable type of entity.

In certain embodiments, the visual planner generated by visual planner application 32 includes one or more nodes, each node corresponding to a portion of the strategic plan. For example, a first node may correspond to an overall portion of the strategic plan, and one or more second nodes may correspond to various corresponding sub-portions of the strategic plan. In certain embodiments, the one or more nodes of the visual planner are arranged in an organogram structure. An organogram structure is akin to an organizational chart in which an item is shown as a node with hierarchal significance and the connectedness of each item to each other is shown. For example, an organizational chart may be a diagram showing a portion or all of the structure of an organization or other entity and the relationships and relative positions of the organization's parts and positions. In certain embodiments, the nodes of the visual planner, whether organogram or otherwise, are arranged in a hierarchical fashion. For example, an organizational chart of a business entity may illustrate the relationships between the people within the business entity. Although described as having an organogram structure, it should be understood that an organogram-style visual planner need not correspond to the organizational arrangement of the organization for which the strategic plan is represented. Particular example visual planners are described below with reference to FIGS. 2 and 3.

The visual planner generated by visual planner application 32 may provide an organization with a unified framework to illustrate the organization's strategic plan. This may allow users to easily and effectively view an organization's strategic plan, and to drill down into the additional details of the strategic plan. In certain embodiments, having an effective display of an organization's strategic plan and certain limitations within their own department may improve transparency for members within an organization, and may allow those members to see the effects of the overall strategic plan on their departments and the effects of decisions made within their department on the overall strategic plan, if appropriate. In addition, an organization may benefit from each manager being more aware of the organization's complete strategic plan. In certain embodiments, computer resources and bandwidth may be conserved by having an organization's overall strategic plan in a consolidated application.

As an example of a visual planner that may be generated by visual planner application 32, a strategic plan of a company may involve a particular staffing level (i.e., a particular number of employees, which may be less than, equal to, or greater than the current number of employees of the company) and an allocation of a limited budget. The visual planner generated by visual planner application 32 may include a top-level (parent) node that corresponds to the overall plan for the company, as well as a number of child nodes, which may include one or more subdivisions of the company, one or more departments of the company (or its subdivisions), and other suitable units. These child nodes may be split into multiple levels, if appropriate (e.g., one level being a subdivision level and a next level being the departments of that subdivision). Some or all of these nodes may include fields for storing information related to the strategic plan or sub-plans of the strategic plan, examples of which are described below. A user interacting with the generated visual planner may (if authorized) view and modify this information to view the effects of those modifications on the overall strategic plan and/or the sub-plans of the overall strategic plan.

In certain embodiments, visual planner application 32 may generate the visual planner using planning information. For example, visual planner application 32 may access planning information 25 stored in storage module 34 to generate visual planner application 32. Additionally or alternatively, visual planner application 32 may generate the visual planner based on user input provided via computer system 12. It should be understood that a portion or all of planning information 34 stored in storage module 34 also may be provided by a user of computer system 12, if appropriate.

As described in more detail below, visual planner application 32 may implement functionality for allowing users (e.g., of computer system 12) to add nodes to the visual planner, delete nodes from the visual planner, and modify nodes of the visual planner. For example, a user may add a node to the visual planner if a new portion of the strategic plan warrants creation of a new node. As another example, a user may delete a node from the visual planner if modification of the strategic plan warrants deletion of a node. As another example, a user may modify a node of the visual planner to modify an allocation of resources (e.g., personnel or money) to the nodes of the visual planner. As a particular example of modification, a user may alter values assigned to one or more fields displayed in the visual planner. As another particular example, of modification, a user may add or delete fields due to changes in the types of resources appropriate for the strategic plan.

Visual planner application 32 may be able to control access to information displayed in a visual planner. In certain embodiments, access to information may include one or more of an ability to view the information and an ability to edit the information. Certain users may have some, none, or all of these rights. For example, depending on the user requesting access to a portion of the visual planner, visual planner application 32 may determine which, if any, portions of the visual planner are appropriate to display. As a particular example, it may be appropriate to only display certain nodes and/or information in the nodes of the visual planner to a particular user. Visual planner application 32 may control what operations (e.g., changes to the visual planner) a user is able to perform in a similar manner. For example, visual planner application 32 may allow certain users to view and edit portions of the visual planner, certain users only to view portions of the visual planner, and certain user neither the ability to view nor the ability to edit certain portions of the visual planner.

This access control functionality may be implemented in any suitable manner, according to particular needs. In certain embodiments, visual planner application 32 may determine an access level defining access rights to individual nodes in visual planner based on a requesting user's role identifier. In certain embodiments, visual planner application 32 may generate and/or display only those nodes appropriate based on the determined access level. In certain embodiments, visual planner application 32 may determine access rights to an individual node by an employee identification, an employee group, or any grouping of employees to restrict access to certain nodes.

As described above, system 10 may include storage module 16, which may store planning information 34. Storage module 16 may include any one or a combination of volatile or non-volatile local or remote devices suitable for storing information. For example, storage module 16 may include RAM, ROM, magnetic storage devices, optical storage devices, or any other suitable information storage device or a combination of these devices. Storage module 16 may be a part of or distinct from computer system 12 and/or processing system 14. Although illustrated and described separately, memory 26 and storage module 16 may be the same component or distinct components. Furthermore, although storage module 16 is illustrated and described as storing particular information, a portion or all of that information may be stored in memory 26 or another suitable location.

Storage module 16 may store planning information 34. In certain embodiments, planning information 34 may include information for use by visual planner application 32 in generating a visual planner. For example, planning information 34 may include information related to the one or more plans (e.g., strategic plans) underlying the visual planner generated by visual planner application 32. As a more particular example, planning information 34 may include information related to an overall plan and information related to one or more sub-plans of the overall plan.

Planning information 34 may include any suitable number and types of planning information 34. For example, planning information 34 may contain a set of planning information for an overall plan and a set of information for sub-plans of the overall plan. As another example, planning information 34 may contain a set of planning information for each of a number of different overall plans. Generally, visual planner application 32 may access and display in the generated visual planner portions of planning information 34 pertinent to the displayed nodes of the visual planner. For example, portions of planning information 34 pertinent to the overall plan may be displayed in a parent node of the visual planner and portions of planning information pertinent to sub-plans of the overall plan may be displayed in one or more child nodes.

In certain embodiments, planning information 34 includes any suitable combination of identification 36, plan amount 38, goal amount 40, over-goal flag 42, mismatched-goal flag 44, role identifier 46, and rules 48. Each of these example types of information are described in more detail below. Planning information 34 may include some, none, or all of these items. While illustrated as including particular example information, planning information 34 may include any suitable information according to particular needs.

Identification 36 generally refers to an identification associated with either a node, such as a parent node or a child node. Identification 36 may be any type of entry used to identify a particular node. For example, identification 36 for a node may include a textual label describing the portion of the plan associated with that node or some other entity associated with the portion of the plan associated with that node. As a particular example, identification 36 for a child node associated with a human resources department may be identified as "Human Resources." Identification 36 may include any suitable combination of an alphanumeric entry, an image, a graphic, a computer-created identifier, and any other suitable identifier for identifying a parent node or a child node.

Plan amount 38 generally refers to an actual or estimated resource amount associated with a node. Plan amount 38 may include any type of concept or item that may be allocated to a portion of the plan being represented by the visual planner, including but not limited to dollars (e.g., of a budget), resources (human or otherwise), inventory, salaries, and expenses. For example, a plan amount 38 for a child node may be an inventory of twenty laptops that would be desired to achieve a portion of a plan associated with that child node. In certain embodiments, the plan amount 38 for the parent node may be calculated based on the plan amount 38 of each child node of that parent node. For example, where plan amounts 38 are expressed as numerals, the plan amount 38 for a parent node may be calculated by summing the plan amounts 38 of each child node of that parent node. A child node and a parent node each may have multiple plan amounts 38. For example, a child node and a parent node may contain a plan amount 38 for headcount and a plan amount 38 for inventory.

Goal amount 40 generally refers to the target amounts associated with the plan amount 38 of a node. As with plan amount 38, goal amount 40 may include any type of concept or item that may be allocated to a portion of the plan being represented by the visual planner, including but not limited to dollars (e.g., of a budget), resources (human or otherwise), inventory, salaries, and expenses. For example, the goal amount 40 for a child node may be a maximum of twelve engineers. In certain embodiments, goal amount 40 is based on historical data of the organization's goal amount 40 and/or plan amount 38. For example, goal amount 40 may be a function of an algorithm, a mean, a standard deviation, or a variance of historical goal amounts 40 and/or plan amounts 38. In certain embodiments, historical information associated with one or more previous periods (e.g., years or other relevant time periods) may be stored in storage module 16 (e.g., as part of or separate from planning information 34). Such historical information may include any suitable information. Additionally or alternatively, goal amount 40 may be based on actual available amounts of an item (e.g., actual number of available qualified employees or other resources for a task). A child node and a parent node may have multiple goal amounts 40 corresponding to one or more plan amounts 38. In certain embodiments, a child node and parent node may have one goal amount 40 corresponding to multiple plan amounts 38.

Over-goal flag 42 generally provides an indicator associated with a node to indicate whether the node's plan amount 38 exceeds the node's goal amount 40. In certain embodiments, if an over-goal flag 42 of a child node is set, the display in the visual planner may include a visual representation of an over-goal flag in both the child node and the parent node of the child node. For example, a child node may have a goal amount 40 of twenty laptops but have a plan amount 38 of twenty-two laptops. In this scenario, the over-goal flag 42 of the child node may be set (and possibly displayed) and the over-goal flag 42 of the parent node may also be set (and possibly displayed). This may allow the effects of an over-goal scenario in a child node on other portions of the overall plan to be determined and reflected in the visual planner.

Over-goal flag 42 may be displayed using any suitable combination of a visual flag, a textual alert in the node, a separate color in the node, and any other suitable type of indicator that the node is over the particular goal amount 40. Over-goal flag 42 may be modified to indicate when a node's plan amount 38 is less than the node's goal amount 40 or any variation of a comparison between a node's plan amount 38 and a node's goal amount 40.

Mismatched-goal flag 44 generally provides an indicator associated with a particular node to indicate whether a goal amount 40 of a parent node of the particular node is equal to the sum of each of the child node's goal amounts 40. An example of a mismatched goal may include a scenario in which a first child node has a goal amount 40 of twenty laptops and a second child node has a goal amount 40 of ten laptops, but the parent node has a goal amount 40 of twenty-five laptops. In this scenario, the mismatched-goal flag 44 of the parent node will be set because the thirty total laptops resulting from the goal amounts 40 of the first and second child nodes exceeds the goal amount 40 (twenty-five laptops) of the parent node. Mismatched-goal flag 44 may be displayed using any suitable combination of a visual flag, a textual alert in the node, a separate color in the node, and any other type of indicator that identifies the parent node as having a mismatched goal amount. Over-goal flag 42 may be modified to indicate any variation of a comparison between a parent node's goal amount 40 and the sum of each of the child's goal amount 40.

Role identifier 46 generally includes one or more roles associated with users who may access system 10 (e.g., via computer system 12). Role identifier 46 may vary depending on the user's position within the organization. For example, role identifier 46 for a lower-level associate in the Human Resources department may only allow the associate to access and view the low-level child node associated with Human Resources. In addition, role identifier 46 may also prohibit or allow access to modify, delete, or add nodes to the visual planner. Role identifier 46 may be any logic, rules, algorithms, code, tables, and/or other suitable instructions used to determine an access level for a user. In certain embodiments, visual planner application 32 may access role identifier 46 as part of implementing the above-described access control functionality. For example, visual planner application 32 may access role identifier 46 to determine which, if any, nodes to include in the visual planner displayed to a particular user.

Rules 48 may include logic, rules, algorithms, code, tables, and/or other suitable instructions embodied in a computer-readable storage medium. Visual planner application 32 may access rules 48 in generating a visual planner or otherwise processing information associated with the visual planner. For example, rules 48 may facilitate the display of the visual planner on GUI 20. As another example, rules 48 may facilitate the identification of mismatched-goal amounts or over-goal amounts among the parent node and child nodes. To identify these mismatched plan amounts or over-goal nodes, rules 48 may reference the associated plan amount 38 and goal amount 40 of each parent node and child node. Rules 48 may apply across some, all, or none of the sets of planning information—including the overall plan and the sub-plans of the overall plan. Rules 48 may also dictate the appearance of the generated visual planner.

In operation of an example embodiment of system 10, visual planner application 32 generates a visual planner by creating one or more nodes, each node corresponding to a portion of the strategic plan. The first node in the visual planner may be the parent node and each subsequent node may be a child node; however, the present disclosure contemplates the visual planner including any suitable number and arrangement of parent nodes and child nodes. Additionally, one or more of the child nodes also may be parent nodes to one or more child nodes.

Visual planner application 32 may access storage module 16 for identification 36, plan amount 38, and goal amount 40 for each sub-plan of the overall plan and identification 36 and goal amount 40 for the overall plan. Visual planner application 32 may calculate plan amount 38 for the parent node by adding the plan amounts of all the sub-plans of the overall plan. For example, visual planner application 32 may calculate plan amount 38 for the parent node by adding the plan amounts of the child nodes of the parent node. The parent node in the visual planner may include identification 36 and goal amount 40 of the overall plan from storage module 16 and the calculated plan amount 38. Each child node in visual planner may include identification 36, plan amount 38, and goal amount 40 for a sub-plan of the overall plan in storage module 16.

Visual planner application 32 may be operable to access rules 48 to determine whether to set over-goal flag 42 for each node and mismatched-goal flag 44 for the parent node. In certain embodiments, for a parent node, over-goal flag 42 may set if (a) plan amount 38 of the parent node is greater than goal amount 40 of the parent node or (b) plan amount 38 of a child node is greater than the corresponding child node's goal amount 40. For a child node, rules 48 may dictate that over-goal flag 42 set if plan amount 38 of a child node is greater than its associated goal amount 40. Rules 48 may dictate that mismatched-goal flag 44 set if goal amount 40 of the parent node does not total the sum of the goal amount 40 of all of the child nodes. Visual planner application 32 may use any number of information or algorithms to assist in determining whether to set over-goal flag 42 for each node or mismatched-goal flag 44 for the parent node.

Visual planner application 32 may be operable to generate a visual planner for GUI 20. For example, visual planner application 32 may arrange the nodes of visual planner in an organogram structure, wherein the visual planner shows the connectedness of the parent node to the child nodes through graphical connections. Visual planner application 32 may create visual planner such that the parent node and its associated information is located in a first area that is in a higher vertical area than the child nodes and its associated information when displayed in GUI 20. In certain embodiments, computer system 12 receives a user interaction in the first area and, in response, visual planner application 32 generates a visual planner displaying the first area.

Visual planner application 32 may substantially instantaneously update visual planner based on a change in plan amount 38 to a child node in visual planner. If a user changes plan amount 38 of a child node, visual planner application 32 may automatically update plan amount 38 of the parent node and over-goal flag 42 for the child node and the parent node. To update the plan amount 38 of the parent node, visual planner application 32 may calculate plan amount 38 of the parent node to comprise of the sum of plan amounts 38 for the child nodes of the parent node. To update over-goal flag 42 for the child node, visual planner application 32 may determine whether plan amount 38 of the child node is greater than the child node's corresponding goal amount 40. To update over-goal flag 42 for the parent node, visual planner application 32 may determine whether updated plan amount 38 of the parent node is greater than goal amount 40 of the parent node and whether over-goal flag 32 has been set for any of the child nodes.

Visual planner application 32 may substantially instantaneously update visual planner based on a change in goal amount 40 to a node in visual planner. If a user changes goal amount 40 of a node, visual planner application 32 may automatically update over-goal flag 42 for that node and mismatched-budget flag 44 for the parent node. To update over-goal flag 42 for the node, visual planner application 32 may determine whether plan amount 38 of the node is greater than updated goal amount 40 of that node. To update mismatched-budget flag 44 for the parent node, visual planner application 32 may determine if goal amount 40 for the parent node is equal to the sum of goal amount 40 of each child node.

Visual planner application 32 may be operable to prohibit or allow access to view, modify, delete, or add nodes to the visual planner based on role identifier 46 associated with a user accessing system 10. Visual planner application 32 may access role identifier 46 to determine which, if any, nodes to include in the visual planner to display to a particular user.

Modifications, additions, or omissions may be made to system 10 without departing from the scope of the disclosure. For example, system 10 may include any number of computers 12, processing system 14, and planning information 34. Any suitable logic may perform the functions of system 10 and the components within system 10.

Figure 2:
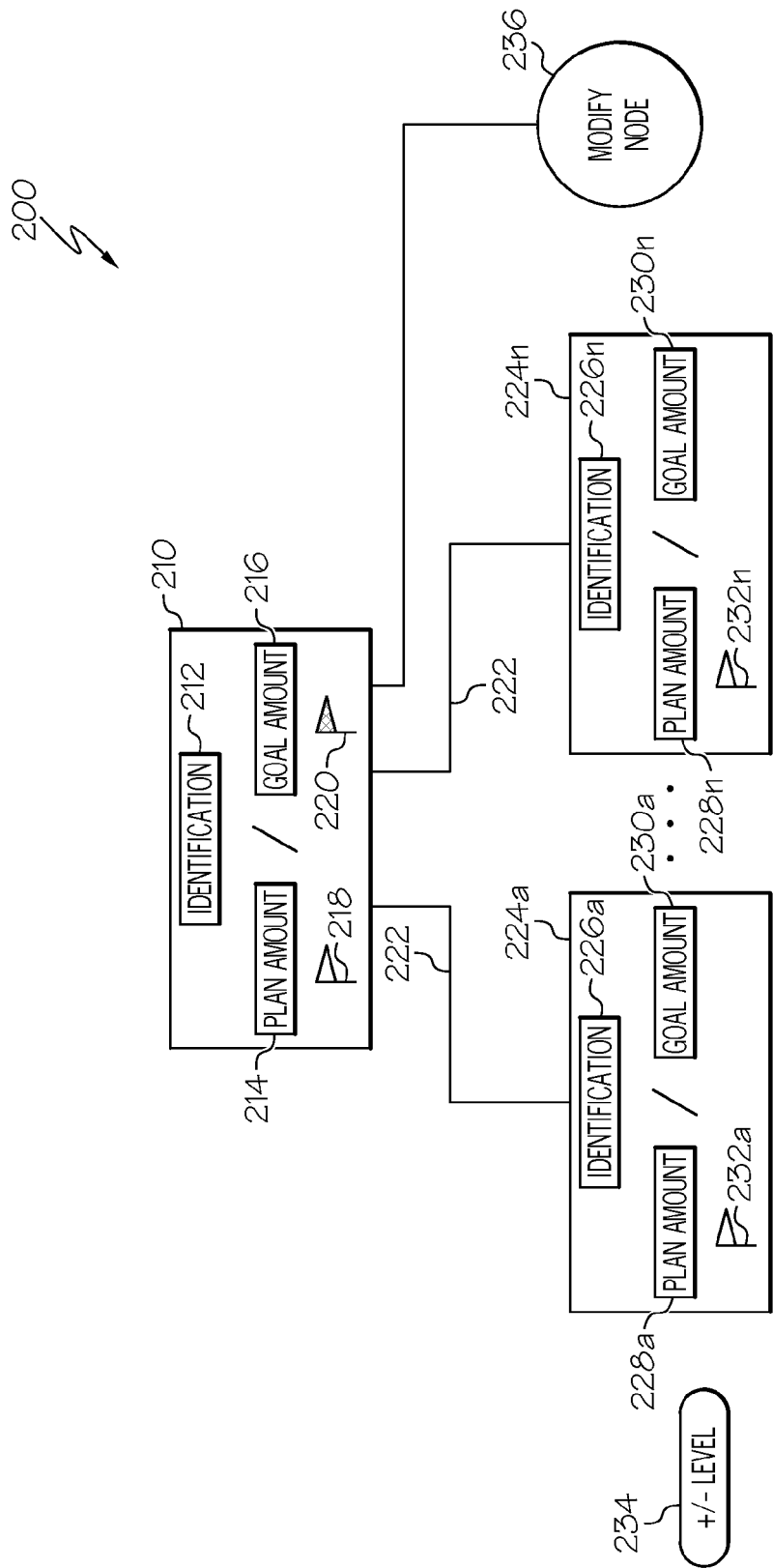
FIG. 2 illustrates an example visual planner, according to certain embodiments of the present disclosure.

FIG. 2 illustrates an example visual planner 200, according to certain embodiments of the present disclosure. Visual planner 200 may be generated by visual planner application 32 and displayed on computer system 12 (e.g., in GUI 20). In the illustrated embodiment, visual planner 200 includes parent node 210, connectors 222, child nodes 224a-224n, display button 234, and modify node button 236, each of which are described in greater detail below. As described above, visual planner application 32 may generate visual planner 200 for a strategic plan based on a portion of planning information 34 corresponding to the strategic plan. In the illustrated example, visual planner 200 is arranged in an organogram structure, as described above.

Parent node 210 contains information corresponding to a first portion of an overall strategic plan. In certain embodiments, parent node 210 is the overall plan of the strategic plan. Additionally or alternatively, parent node 210 may be the child node of a more principal parent node. For example, Parent Node A may have an associated Child Node B. Child Node B may have an associated Child Node C. In this scenario, Node B is the child node of A and the parent node of C.

Parent node 210 may include parent identification 212, which may identify parent node 210 in visual planner 200. Visual planner application 32 may determine parent identification 212 using identification 36 of planning information 34. Parent identification 212 may include any suitable combination of an alphanumeric entry, an image, a graphic, a computer-created identifier, and any other suitable identifier for identifying parent node 212.

Parent node 210 may include parent plan amount 214 and/or parent goal amount 216. Parent plan amount 214 and parent goal amount 216 represent the corresponding plan amount and goal amount for parent node 210. Visual planner application 32 may determine parent goal amount 216 using goal amount 40 of planning information 34. Parent plan amount 214 and parent goal amount 216 can be any suitable combination of numeric text, alphanumeric text, an image, a graphic, or any other type of display that indicates the plan amount 214 and/or goal amount 216 of parent node 210. Further, in certain embodiments, parent plan amount 214 and goal amount 216 can be displayed as a type of graph, illustrating where the plan amount 214 is in relation to the goal amount 216. For example, a bar graph may be used wherein the goal amount 216 establishes the maximum region of the bar and an indicator on the bar indicates where the plan amount 214 is in relation to the goal amount 216. In certain embodiments, if the plan amount 214 is greater than the goal amount 216 (and thereby setting an over-goal flag), the bar graphic changes to a different color (e.g., red).

Parent over-goal flag 218 and parent mismatched-goal flag 220 may indicate whether issues are present with the strategic planning of an organization. Visual planner application 32 may determine parent plan over-goal flag 218 and parent mismatched-goal flag 200 using plan amount 38, goal amount 40, over-goal flag 42, and mismatched-goal flag 44 of planning information 34.

Parent over-goal flag 218 may indicate whether either a child node 224 associated with parent node 210 has a plan amount (e.g., plan amount 228, described below) exceeding the goal amount (e.g., goal amount 230, described below) or parent node 210 has a plan amount 214 exceeding the goal amount 216. Parent mismatched-goal flag 220 may indicate whether the goal amounts (e.g., goal amounts 230) of each of the child nodes 228 associated with the parent node 210 is equal to the goal amount 216 of parent node 210. Parent over-goal flag 218 and parent mismatched-goal flag 220 may be displayed using any suitable combination of a graphical item, a text, an image, a changed visual appearance, or any type of indicator establishing the presence of an over-goal flag 218 or a mismatched-goal flag 220 associated with parent node 210. In certain embodiments, parent over-goal flag 218 and parent mismatched-goal flag 220 may not be displayed when the respective parent over-goal flag 218 or parent mismatched-goal flag 220 is not set.

Connections 222 may represent a connection between nodes. For example, connections 222 illustrate connections between parent node 210 and child nodes 224. Connections 222 may be a line, an arrow, an image, a graphic, or any other type of representation indicating a connection between nodes.

Visual planner 200 includes child nodes 224a-224n, where n represents any suitable number, associated with parent node 210. Child nodes 224a-224n may be associated with a sub-plan portion of the overall strategic plan associated with parent node 210, and may include information corresponding to a sub-plan portion of the overall strategic plan. Child node 224 can be displayed as a shape, a text, an image, or any other type of format that allows the user to view the child node and its corresponding information.

In certain embodiments, child nodes 224a-224n are located in the same area of GUI 20 and parent node 210 is located in a different area of GUI 20. As illustrated in FIG. 2, the graphical area containing child nodes 224a-224n are located in a lower graphical area than the graphical area containing parent node 210. In certain embodiments, the graphical area containing child nodes 224a-224n may be located in any direction in relation to the area containing parent node 210.

Child node 224 may include child identification 226, which may identify child node 224 in visual planner 200. Visual planner application 32 may determine child identification 226 using identification 36 of planning information 34. Child identification 226 may include any suitable combination of an alphanumeric entry, an image, a graphic, a computer-created identifier, and any other suitable identifier for identifying child node 224.

Child node 224 may include child plan amount 228 and/or child goal amount 230. Child plan amount 228 and child goal amount 230 represent the corresponding plan amount and goal amount for child node 224. Visual planner application 32 may determine child plan amount 228 and child goal amount 230 using plan amount 38 and goal amount 40, respectively, of planning information 34. Child plan amount 228 and child goal amount 230 may include any suitable combination of an alphanumeric entry, an image, a graphic, a computer-created identifier, and any other suitable type of display that indicates child plan amount 228 and/or child goal amount 230. Further, in certain embodiments, child plan amount 228 and child node goal amount 230 can be displayed as a type of graph, illustrating where the plan amount 228 is in relation to the goal amount 230. For example, a bar graph may be used wherein the goal amount 230 establishes the maximum region of the bar and an indicator on the bar indicates where the plan amount 228 is in relation to the goal amount 230. In certain embodiments, if the plan amount 228 is greater than the goal amount 230 (and thereby setting an over-goal flag), the bar graphic will change to a different color (e.g., red).

Child over-goal flag 232 may indicate whether issues are present with the strategic planning of an organization. Visual planner application 32 may determine child plan over-goal flag 232 using plan amount 38, goal amount 40, and over-goal flag 42 of planning information 34. Child over-goal flag 232 may be displayed using any suitable combination of a graphical item, a text, an image, a changed visual appearance, or any type of indicator establishing the presence of an over-goal flag 232 associated with child node 224. In certain embodiments, child over-goal flag 232 may not be displayed when the respective child over-goal flag 232 is not set.

Display button 234 may be selected to expand or contract the displayed levels of visual planner 200. For example, selecting display button 234 may contract child nodes 224a-224n, leaving only parent node 210 in the display. As another example, display button 234 may expand or contract an individual child node. As another example, display button 234 may expand or contract parent node 210, leaving only child nodes 236a-235n to display. Although expanding and contracting is primarily described, the present disclosure contemplates any suitable visual alteration of visual planner 200, according to particular needs. For example, the selection of display button 234 may prompt any suitable visual alteration of visual planner 200 that allows navigation of the nodes and/or the entirety of visual planner 200.

In certain embodiments, processing system 14 receives (e.g., from computer system 12) a user interaction in the first area of GUI 20, and, in response to the user interaction, displays the first area in GUI 20. In certain embodiments, this may include processing system 14 receiving an interaction in either the first area, the second area, or another area of GUI 20 and, in response to the user interaction, display either first area, second area, both areas, or neither of the areas in GUI 20. User interaction may include a mouse click, a keyboard entry, a terminal input, or any type of indication of a user interacting with processing system 14. Display button 234 may be a separate button, a button located at each node of visual planner 200, or an option setting separately provided (e.g., through a menu). Display button 234 may be displayed using any suitable combination of a button, icon, item, graphic, image, setting, and any other suitable type of indicator.

Visual planner 200 may include modify node button 236. Modify node button 236 may add or remove a node to the child node level as described further in FIG. 5. For example, selecting modify node button 236 may add an additional child node 234 to child nodes 234a-234n. In another example, selecting modify node button 236 may delete an already existing child node 234 from child nodes 234a-234n. Modify node button 236 may be a separate button, a button located at each node, or an option setting separately provided (e.g., through a menu). Modify node button 236 may be displayed using any suitable combination of a button, icon, item, graphic, image, setting, and any other suitable type of indicator.

Modifications, additions, or omissions may be made to visual planner 200 without departing from the scope of the disclosure.

Figure 3:
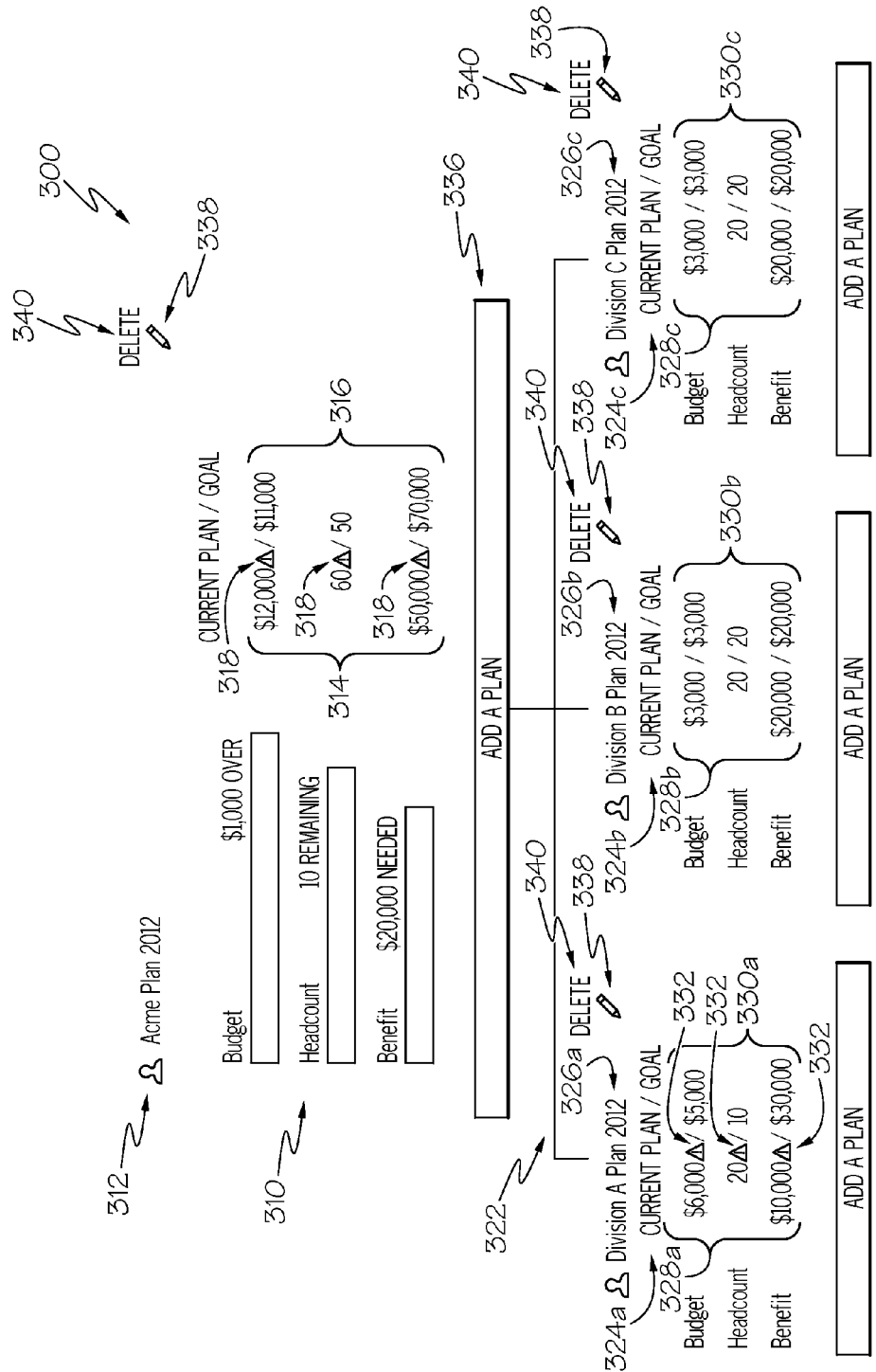
FIG. 3 illustrates an example visual planner, which includes various plan information for a represented strategic plan, according to certain embodiments of the present disclosure.

FIG. 3 illustrates an example visual planner 300, which includes various plan information 34 for a represented strategic plan, according to certain embodiments of the present disclosure. In the illustrated example, visual planner 300 represents a 2012 strategic plan for the Acme Company, and includes planning information 34 associated with the 2012 strategic plan for the Acme Company.

In general, visual planner 300 provides a concise, user-friendly display of the identifier, plan amount, and goal amount associated with an overall plan and sub-plans of the overall plan contained in individual nodes. Visual planner 300 displays these nodes in an organogram structure, providing the user an intuitive display as to the structure of the strategic plan and/or the entities implementing the strategic plan, including the hierarchy of the parent node to each child node. In certain embodiments, aspects of visual planner 300 correspond to aspects of the above-described visual planner 200. Modifications, additions, or omissions may be made to visual planner 300 without departing from the scope of the disclosure.

In the illustrated example, visual planner 300 includes parent node 310; child nodes 324a-c; add plan button 336; edit plan button 338; and delete plan button 340. As described above, visual planner application 32 may generate, possibly for display on computer system 12, visual planner 300 for a strategic plan based on a portion of planning information 34 corresponding to the strategic plan. In the illustrated screenshot 300, parent node 310 and child nodes 324a-c are arranged in an organogram structure, as described above.

Parent node 310 contains information corresponding to a first portion of an overall strategic plan. Parent node 310 includes parent identification 312 (e.g., "Acme Plan 2012"), parent plan amounts 314 (e.g., $12,000 for Budget, 60 for Headcount, and $50,000 for Benefit), and parent goal amounts 316 (e.g., $11,000 for Budget, 50 for Headcount, and $70,000 for Benefit). In this example, plan amounts 314 of parent node 310 reflect the sum of the corresponding plan amounts 328a-c of child nodes 324a-c. For example, visual planner application 32 may calculate the plan amounts 314 of parent node 310 by summing corresponding plan amounts 328a-c of child nodes 324a-c. As a particular example, visual planner application 32 may sum the budget plan amounts 328a ($6,000), 328b ($3,000), and 328c ($3,000) of child nodes 324a-c, respectively, to determine the budget plan amount 314 ($12,000) of parent node 310.

Visual planner 300 displays over-goal flag 318 for budget, headcount, and benefit strategic plan in parent node 310 because visual planner application 32 set the over-goal flag 318 for each of plan amounts 314 of parent node 310. For example, visual planner application 32 set the over-goal flag 318 for the budget plan amount 314 of parent node 310 because the plan amount 318 ($12,000) was greater than its corresponding goal amount 316 ($11,000).

Connections 322 represent connections between nodes of visual planner 300. Connections 322 in visual planner 300 illustrate connections between parent node 310 and child nodes 324a-c.

In certain embodiments, child nodes 324a-c contain information associated with a sub-plan portion of the overall strategic plan associated with parent node 312. In this example, each child node 324 corresponds to a division of the Acme Company and includes information associated with a sub-plan portion of the overall strategic plan for the Acme Company that corresponds to that division. Child nodes 324 include child identification 326a-c ("Division A Plan 2012," "Division B Plan 2012," and "Division C Plan 2012," respectively), child plan amount 328, and child goal amount 330. Visual planner application 32 may determine child plan amounts 328 and child goal amounts 330 using plan amounts 38 and goal amounts 40, respectively, of planning information 34.

Visual planner 300 may display over-goal flag 318 for budget, headcount, and benefit in child node 324a because visual planner application 32 set the over-goal flag 318 for each of the plan amounts 328. For example, visual planner application 32 set the over-goal flag 318 for the budget plan amount 328 of child node 324a because the budget plan amount 328 ($6,000) exceeds the corresponding goal amount 330 ($5,000).

Visual planner 300 may include an add plan button 314, edit plan button 338, and delete plan button 340. Selecting add plan button 314 may add a node to the child node level as described further in FIG. 5. For example, selecting add plan button 314 may add an additional child node 324d to child nodes 324a-c.

Selecting edit node button 338 allows a user to edit information contained in the node associated with the edit node button 338. For edit node button 338 associated with parent node 310, a user may edit parent identification 312 and parent goal amount 316. For edit node button 338 associated with child node 324a-c, a user may edit identification 326, plan amount 328, and goal amount 330 for that child node 324. In certain embodiments, in response to a user editing information contained in a node of visual planner 300, visual planner application 32 may add, delete, or otherwise modify the corresponding planning information 34 in storage module 16.

Selecting delete node button 338 may delete the corresponding node from visual planner 300. Selecting delete plan button 338 corresponding to a child node 324 may delete a node from the child node level as described further in FIG. 5. For example, selecting delete plan button 338 associated with child node 324c may delete child node 324c, leaving only 324a and 324b as child nodes 324. As another example, selecting delete plan button 338 corresponding to parent node 310 may delete the entire plan of visual planner 300. Additionally or alternatively, selecting the delete plan button 338 may result in one or more nodes 324 being promoted to the parent node level of visual planner 300.

Figure 4:
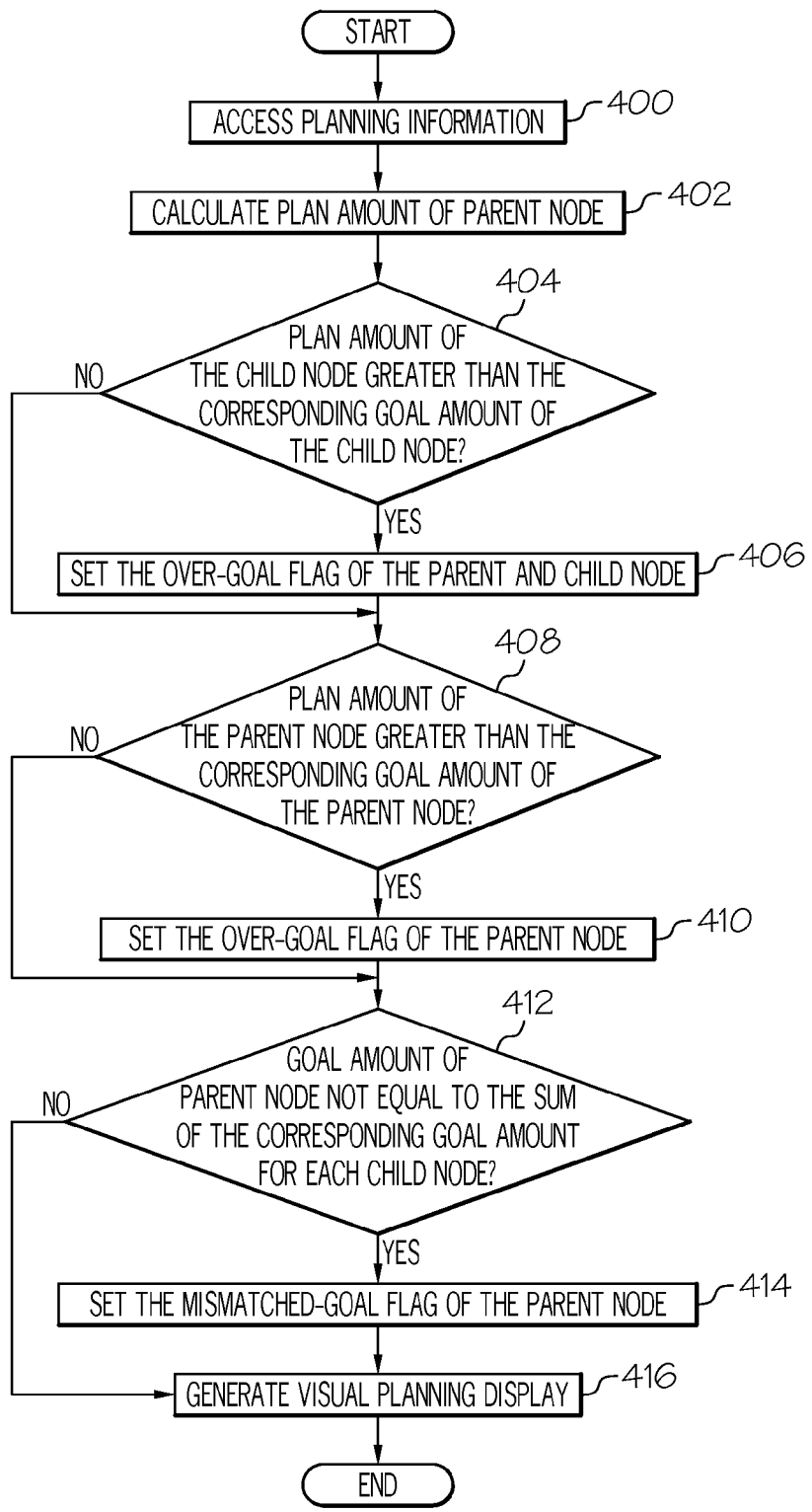
FIG. 4 illustrates an example method for generating a visual planner for strategic planning, according to certain embodiments of the present disclosure.

FIG. 4 illustrates an example method for generating a visual planner 200 for strategic planning, according to certain embodiments of the present disclosure. The method may be implemented in any suitable combination of software, firmware, and hardware, according to particular needs. Although particular components may be identified as performing particular steps, the present disclosure contemplates any suitable components performing the steps according to particular needs. It should be understood that references to visual planner 200 and its subcomponents include references to visual planner 300 and its subcomponents, where appropriate.

At step 400, processing system 14 accesses planning information 34 for information associated with an overall plan and one or more sub-plans of the overall plan. In certain embodiments, a user enters planning information 34 into computer system 12, and computer system 12 communicates the overall plan and one or more sub-plans to processing system 14 and/or storage module 16.

At step 402, processing system 14 calculates the plan amount 214 for parent node 210. The plan amount for the parent node comprises the sum of the plan amounts of each child node. The plan amount for the parent node may be adjusted to compensate for additional resources not tracked in the child node.

At step 404, processing system 14 compares the plan amount 228 of each child node 224 to its corresponding goal amount 230. If a plan amount 228 of the child node 224 is greater than the corresponding goal amount 230, the method proceeds to step 406 where processing system 14 sets over-goal flags 232 and 218 of the child node 224 and the parent node 210, respectively. Otherwise, the method proceeds to step 408. In certain embodiments, processing system 14 may output a result of the comparison between each child node 224's plan amount 228 and its corresponding goal amount 230.

At step 408, processing system 14 compares the calculated plan amount 214 of parent node 210 to the goal amount 216 of the parent node 210. If the parent node 210 has a plan amount 214 that is greater than its corresponding goal amount 216, the method proceeds to step 410 where processing system 14 sets the over-goal flag 218 of the parent node 210. Otherwise, the method proceeds to step 412. In certain embodiments, processing system 14 may output a result of the comparison between the parent node 210's plan amount 214 and its corresponding goal amount 216.

At step 412, processing system 14 compares the goal amount 218 of the parent node 210 to the sum of the goal amounts 230 for all (or an appropriate subset) of the child nodes 224. If the goal amount 216 of the parent node 210 is not equal to the sum of the goal amounts 230 for all (or an appropriate subset) of the child nodes 224, the method proceeds to step 414 where processing system 14 sets mismatched-goal flag 220 of the parent node 210. Otherwise, the method proceeds to step 416. In certain embodiments, processing system 14 may output a result of the comparison between the goal amount 216 of the parent node 210 to the sum of the goal amounts 230 for all (or an appropriate subset) of the child nodes 224.

At step 416, processing system 14 generates visual planner 200. In certain embodiments, visual planner 200 consists of the parent node identification 212, parent plan amount 214, the parent goal amount 216, the parent node over-goal flag 218, and the parent node mismatched goal-flag 220 in a first area of GUI 20 and the child node identification 226, child plan amount 228, child goal amount 230, and the child node over-goal flag 232 of each child node 224 in a second area of GUI 20. In certain embodiments, the first area is located at a higher vertical area on GUI 20 than the second area; however, this is described for example purposes only.

Visual planner application 32 may substantially instantaneously update visual planner 200 based on a change in planning information 34. A user may change planning information 34 (e.g., one or more of identification 36, plan amount 28, and/or goal amount 40) for a node. If a user changes plan amount 38 of a child node 224, visual planner application 32 may automatically update plan amount 38 of the parent node 210 and over-goal flag 42 for the child node 224 and the parent node 210. If a user changes goal amount 40 of a child node 224, visual planner application 32 may automatically update over-goal flag 42 for the child node 224 and mismatched-budget flag 44 for the parent node 210. If a user changes goal amount 40 for a parent node 210, visual planner application 32 may automatically update over-goal flag 42 and mismatched-budget flag 44 for the parent node 210.

Modifications, additions, or omissions may be made to the method depicted in FIG. 4. The method may include more, fewer, or other steps. For example, processing system 14 may determine, based on a role identifier, which nodes to generate for visual planner. Additionally, steps may be performed in parallel or in any suitable order. While described as processing system 14 performing the steps, any suitable component of system 10 may perform one or more steps of the method.

Figure 5:
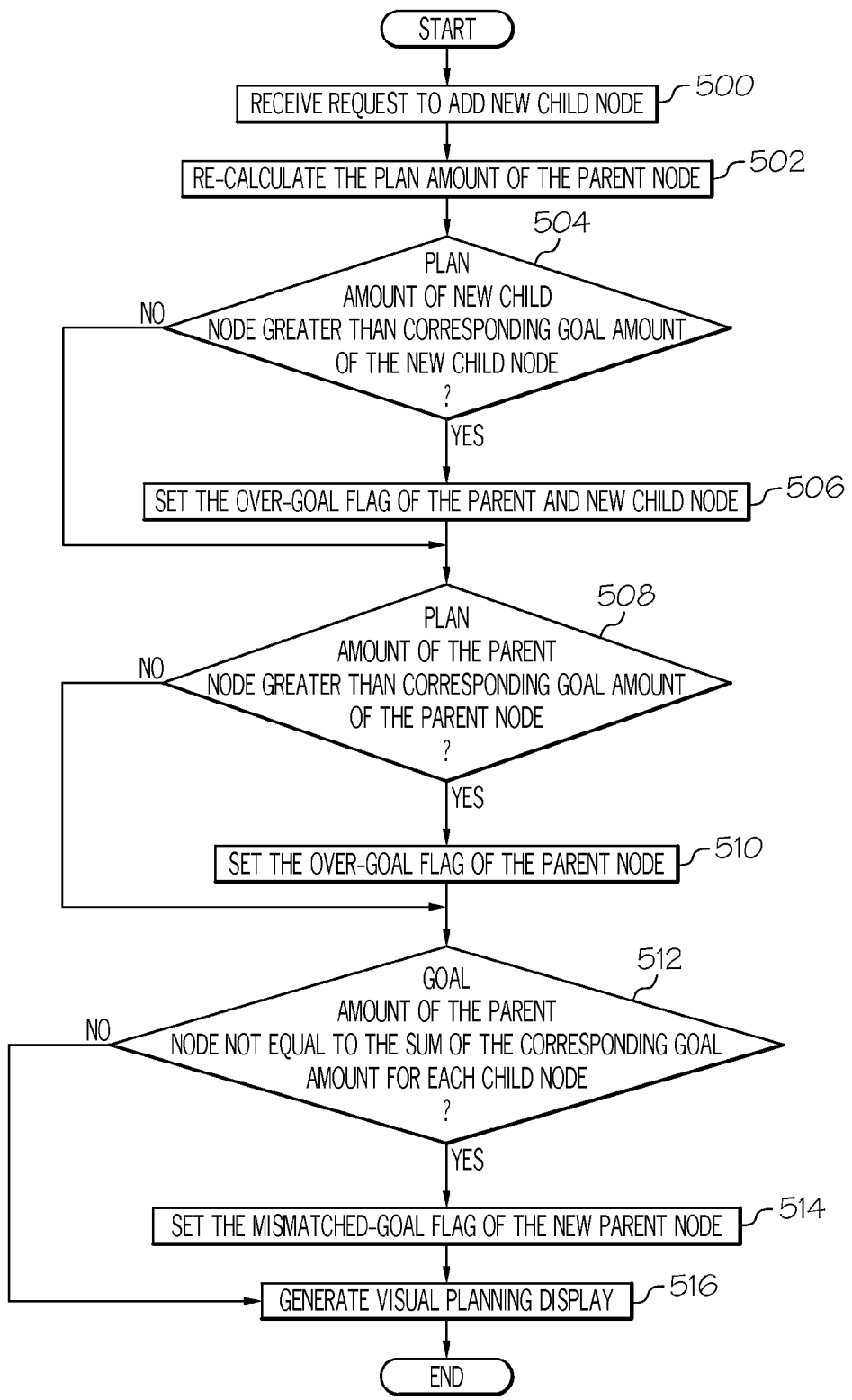
FIG. 5 illustrates an example method for adding a new child node to the visual planner, according to certain embodiments of the present disclosure.

FIG. 5 illustrates an example method for adding a new child node to the visual planner, according to certain embodiments of the present disclosure. The method may be implemented in any suitable combination of software, firmware, and hardware, according to particular needs. Although particular components may be identified as performing particular steps, the present disclosure contemplates any suitable components performing the steps according to particular needs. It should be understood that references to visual planner 200 and its subcomponents include references to visual planner 300 and its subcomponents, where appropriate.

At step 500, processing system 14 receives a request to add a new child node 224, the new child node 224 being dependent on parent node 210. The request may be from a user interaction (e.g., with user system 12) or a change in planning information 34, for example. Processing system 14 may access planning information 34 for the new child node 224, including, for example, one or more of identification 36, plan amount 38, and goal amount 40 of a corresponding sub-plan from planning information 34. In certain embodiments, a user of user system 12 may input identification 36, plan amount 38, goal amount 40, and/or any other suitable planning information 34 for the new child node 224.

Although an example of adding a child node 224 is primarily described with reference to FIG. 5, it should be understood that certain embodiments of the present disclosure contemplate a user being able to perform any suitable combination (possibly, with appropriate authentication) of adding, deleting, and/or otherwise modifying a node (e.g., including a parent node 210 and/or a child node 224). For example, a user may modify a child node 224 by updating the identification 36, plan amount 38, goal amount 40, and/or other suitable planning information 34 for the child node 224 or by deleting the child node 224. As another example, a user may modify a parent node 210's identification 36 and/or goal amount 40.

At step 502, processing system 14 re-calculates the plan amount 38 of the parent node 210. Processing system 14 may re-calculate the sum of the plan amounts 38 of each child node 224, including the new child node 224, to determine the updated plan amount 38 for the parent node 210. In certain embodiments, the plan amount 38 of the new child node 224 is added to the pre-existing plan amount 38 of the parent node 210 to determine the updated plan amount 38 of the parent node 210.

At step 504, processing system 14 compares the plan amount 38 of the new child node 224 to the corresponding goal amount 40 of the new child node 224. If the plan amount 38 of the new child node 224 exceeds the corresponding goal amount 40 of the new child node 224, then the method proceeds to step 506 where processing system 14 sets the over-goal flag 42 of the new child node 224 and the parent node 210. Otherwise, the method proceeds to 508. In certain embodiments, processing system 14 may output a result of the comparison between the plan amount 38 of the new child node 224 and the corresponding goal amount 40 of the new child node 224.

At step 508, processing system 14 compares the updated plan amount 38 of parent node 210 to the goal amount 40 of parent node 210. If the plan amount 38 of parent node 210 exceeds the corresponding goal amount 40 of parent node 210, then the method proceeds to step 510 where processing system 14 sets the over-goal flag 42 of parent node 210. Otherwise, the method proceeds to step 512. In certain embodiments, processing system 14 outputs a result of the comparison between the updated plan amount 38 of parent node 210 and the corresponding goal amount 40 of parent node 210.

At step 512, processing system 14 compares the goal amount 40 of parent node 210 to the sum of the goal amounts 40 for all of child nodes 224 of parent node 210, including the new child node 224. If the goal amount 40 of parent node 210 does not equal the sum of the goal amounts 30 for all of the child nodes 224 of parent node 210, the method proceeds to step 514 where processing system 14 sets mismatched-goal flag 44 of parent node 210. Otherwise, the method proceeds to step 516. In certain embodiments, processing system 14 outputs a result of the comparison between the goal amount 40 of parent node 210 to the sum of the goal amounts 40 for all of the child nodes 224 of parent node 210.

At step 516, processing system 14 generates a visual planner 200. Visual planner 200 may include the parent node 210 and each child node 224, including the new child node 224.

In operation of an example embodiment of system 10, visual planner application 32 may add a new child node dependent on the parent node. In certain embodiments, visual planner application 32 may update visual planner by updating plan amount 38 of the parent node, over-goal flag 42 for the new child node and the parent node, and mismatched-goal flag 44 for the parent node. To update the plan amount of the parent node, visual planner application 32 may calculate plan amount 38 of the parent node to comprise of the sum of plan amounts 38 for the plurality of child nodes, including the new child node. To update the over-goal flag, visual planner application 32 may determine whether updated plan amount 38 of the parent node is greater than goal amount 40 of the parent node and whether plan amount 38 of the new child node is greater than the new child node's corresponding goal amount 38. To update mismatched-budget flag 44, visual planner application 32 may determine if goal amount 40 for the parent node is equal to the sum of goal amount 40 of each child node, including the new child node.

Modifications, additions, or omissions may be made to the method depicted in FIG. 5. The method may include more, fewer, or other steps. For example, processing system 14 may determine based on a role identifier which nodes to generate in visual planner. Additionally, steps may be performed in parallel or in any suitable order. While described as processing system 14 performing the steps, any suitable component of system 10 may perform one or more steps of the method.

Certain embodiments of the present disclosure may provide one or more technical advantages. For example, certain embodiments may allow generation of a visual planner for a strategic plan. As another example, certain embodiments may provide a standardized approach to adjusting and viewing an organization's strategic plan. As another example, certain embodiments may provide a framework to track and evaluate an organization's strategic plan. As another example, certain embodiments may improve a user's ability to view and manage a strategic plan, particularly if the strategic plan is convoluted. As another example, certain embodiments may substantially instantaneously update plans and goals in the strategic plan and automatically discover or otherwise highlight problems within the strategic plan.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
accessing planning information for an organization, the planning information comprising information associated with an overall plan and a plurality of sub-plans of the overall plan;
generating a visual planner in a graphical user interface, the visual planner comprising a plurality of nodes arranged in an organogram structure, the plurality of nodes comprising:
a parent node comprising an identification of a first portion of the overall plan, a goal amount corresponding to the first portion of the plan, an over-goal flag, and a plan amount; and
a plurality of child nodes each comprising an identification of a corresponding portion of the overall plan, a corresponding plan amount for the corresponding portion of the plan, and a corresponding goal amount for the corresponding portion of the plan, the plan amount of the parent node comprising the sum of the plan amounts of the plurality of child nodes;
determining whether the plan amount associated with the parent node is greater than the goal amount associated with the parent node; and
when the plan amount associated with the parent node is greater than the goal amount associated with the parent node, setting the over-goal flag associated with the parent node.

2. The method of claim 1, wherein the first portion of the overall plan is the overall plan.

3. The method of claim 1, wherein:
the child node further comprises an over-goal flag; and
the method further comprises:

determining whether the plan amount of each child node is greater than the corresponding goal amount of the child node;

setting the over-goal flag of the parent node if the plan amount of the child node is greater than the corresponding goal amount of the child node; and setting the over-goal flag for the child node if the plan amount of the child node is greater than the corresponding goal amount of the child node.

4. The method of claim 3, further comprising:

displaying the visual planner, wherein the identification of the parent node and the over-goal flag displayed in a first area and the identification of each child node displayed in a second area in a graphical user interface, the second area displayed at a lower vertical area than the first area;

receiving a user interaction in the first area in the graphical user interface; and displaying, in response to the user interaction in the first area in the graphical user interface, the first area in the graphical user interface.

5. The method of claim 3, further comprising:

adding a new child node dependent on the parent node;

determining the plan amount of the parent node, the plan amount of the parent node comprising the sum of the plan amount for the plurality of child nodes and the new child node;

determining whether the plan amount of the parent node is greater than the goal amount of the parent node; and setting the over-goal flag of the parent node if the total amount of the parent node is greater than the goal amount of the parent node.

6. The method of claim 1, wherein:

the parent node further comprises a mismatched-goal flag; and the method further comprises:

determining whether the goal amount of the parent node is equal to the sum of the corresponding goal amount of each child node; and setting the mismatched-goal flag for the parent node if the goal amount of the parent node is not equal to the sum of the goal amount for each child node.

7. The method of claim 1, further comprising:

receiving a request to access the visual planner, the request associated with a role identifier;

determining, based on the role identifier, an access level, the access level defining access rights to the plurality of nodes; and displaying the visual planner according to the access rights such that the displayed visual planner comprises only nodes authorized according to the access rights.

8. A system, comprising:

a network interface operable to access planning information for an organization, the planning information comprising information associated with an overall plan and a plurality of sub-plans of the overall plan; and a processor communicatively coupled to the network interface and operable to:

generate a visual planner in a graphical user interface, the visual planner comprising a plurality of nodes arranged in an organogram structure, the plurality of nodes comprising:

a parent node comprising an identification of a first portion of the overall plan, a goal amount corresponding to the first portion of the plan, an over-goal flag, and a plan amount; and a plurality of child nodes each comprising an identification of a corresponding portion of the overall plan, a corresponding plan amount for the corresponding portion of the plan, and a corresponding goal amount for the corresponding portion of the plan, the plan amount of the parent node comprising the sum of the plan amounts of the plurality of child nodes;

determine whether the plan amount associated with the parent node is greater than the goal amount associated with the parent node; and when the plan amount associated with the parent node is greater than the goal amount associated with the parent node, set the over-goal flag associated with the parent node.

9. The system of claim 8, wherein the first portion of the overall plan is the overall plan.

10. The system of claim 8, wherein:

the child node further comprises an over-goal flag; and the processor is further operable to:

determine whether the plan amount of each child node is greater than the corresponding goal amount of the child node;

set the over-goal flag of the parent node if the plan amount of the child node is greater than the corresponding goal amount of the child node; and set the over-goal flag for the child node if the plan amount of the child node is greater than the corresponding goal amount of the child node.

11. The system of claim 10, wherein:

the processor is further operable to:

display the visual planner, wherein the identification of the parent node and the over-goal flag displayed in a first area and the identification of each child node displayed in a second area in a graphical user interface, the second area displayed at a lower vertical area than the first area;

display, in response to the user interaction in the first area in the graphical user interface, the first area in the graphical user interface; and an input device, communicatively coupled to the processor and operable to receive a user interaction in the first area in the graphical user interface.

12. The system of claim 10, wherein:

the processor is further operable to:

add a new child node dependent on the parent node;

determine the plan amount of the parent node, the plan amount of the parent node comprising the sum of the plan amount for the plurality of child nodes and the new child node;

determine whether the plan amount of the parent node is greater than the goal amount of the parent node; and set the over-goal flag of the parent node if the total amount of the parent node is greater than the goal amount of the parent node.

13. The system of claim 8, wherein:

the parent node further comprises a mismatched-goal flag; and the processor is further operable to:

determine whether the goal amount of the parent node is equal to the sum of the corresponding goal amount of each child node; and set the mismatched-goal flag for the parent node if the goal amount of the parent node is not equal to the sum of the goal amount for each child node.

14. The system of claim 8, wherein the processor is further operable to:

receive a request to access the visual planner, the request associated with a role identifier;

determine, based on the role identifier, an access level, the access level defining access rights to the plurality of nodes; and display the visual planner according to the access rights such that the displayed visual planner comprises only nodes authorized according to the access rights.

15. A computer program product comprising:

a non-transitory computer readable storage medium having computer readable program code embodied therewith, the computer readable program code comprising:

computer readable program code configured to access planning information for an organization, the planning information comprising information associated with an overall plan and a plurality of sub-plans of the overall plan;

computer readable program code configured to generate a visual planner in a graphical user interface, the visual planner comprising a plurality of nodes arranged in an organogram structure, the plurality of nodes comprising:

a parent node comprising an identification of a first portion of the overall plan, a goal amount corresponding to the first portion of the plan, an over-goal flag, and a plan amount; and a plurality of child nodes each comprising an identification of a corresponding portion of the overall plan, a corresponding plan amount for the corresponding portion of the plan, and a corresponding goal amount for the corresponding portion of the plan, the plan amount of the parent node comprising the sum of the plan amounts of the plurality of child nodes;

computer readable program code configured to determine whether the plan amount associated with the parent node is greater than the goal amount associated with the parent node; and computer readable program code configured to set the over-goal flag associated with the parent node when the plan amount associated with the parent node is greater than the goal amount associated with the parent node.

16. The computer program product of claim 15, wherein the first portion of the overall plan is the overall plan.

17. The computer program product of claim 15, wherein:

the child node further comprises an over-goal flag; and the computer readable program code further comprises:

computer readable program code configured to determine whether the plan amount of each child node is greater than the corresponding goal amount of the child node;

computer readable program code configured to set the over-goal flag of the parent node if the plan amount of the child node is greater than the corresponding goal amount of the child node; and computer readable program code configured to set the over-goal flag for the child node if the plan amount of the child node is greater than the corresponding goal amount of the child node.

18. The computer program product of claim 17, wherein the computer readable program code further comprises:

computer readable program code configured to display the visual planner, wherein the identification of the parent node and the over-goal flag displayed in a first area and the identification of each child node displayed in a second area in a graphical user interface, the second area displayed at a lower vertical area than the first area;

computer readable program code configured to receive a user interaction in the first area in the graphical user interface; and computer readable program code configured to display, in response to the user interaction in the first area in the graphical user interface, the first area in the graphical user interface.

19. The computer program product of claim 17, wherein the computer readable program code further comprises:

computer readable program code configured to add a new child node dependent on the parent node;

computer readable program code configured to determine the plan amount of the parent node, the plan amount of the parent node comprising the sum of the plan amount for the plurality of child nodes and the new child node;

computer readable program code configured to determine whether the plan amount of the parent node is greater than the goal amount of the parent node; and computer readable program code configured to set the over-goal flag of the parent node if the total amount of the parent node is greater than the goal amount of the parent node.

20. The computer program product of claim 15, wherein:

the parent node further comprises a mismatched-goal flag; and the computer readable program code further comprises:

computer readable program code configured to determine whether the goal amount of the parent node is equal to the sum of the corresponding goal amount of each child node; and computer readable program code configured to set the mismatched-goal flag for the parent node if the goal amount of the parent node is not equal to the sum of the goal amount for each child node.

21. The computer program product of claim 15, wherein the computer readable program code further comprises:

computer readable program code configured to receive a request to access the visual planner, the request associated with a role identifier;

computer readable program code configured to determine, based on the role identifier, an access level, the access level defining access rights to the plurality of nodes; and computer readable program code configured to display the visual planner according to the access rights such that the displayed visual planner comprises only nodes authorized according to the access rights.

* * * * *